United States Patent [19]

Krutak et al.

[11] Patent Number: 4,999,418

[45] Date of Patent: Mar. 12, 1991

[54] POLYESTERS COLORED WITH THE RESIDUE OF HEAT STABLE ANTHRAQUINONE COMPOUNDS

[75] Inventors: James J. Krutak; Max A. Weaver; Clarence A. Coates, Jr., all of Kingsport; Samuel D. Hilbert, Jonesborough; Wayne P. Pruett; William W. Parham, both of Kingsport, all of Tenn.

[73] Assignee: Eastman Kodak Company, Rochester, N.Y.

[21] Appl. No.: 401,270

[22] Filed: Aug. 31, 1989

[51] Int. Cl.$^5$ .............................................. C08G 63/20
[52] U.S. Cl. .................... 528/272; 528/220; 528/226; 528/228; 528/229; 528/291; 528/298; 528/302; 528/308; 528/308.6; 528/332; 528/425; 525/437; 525/443; 525/471; 524/765; 524/770; 8/676
[58] Field of Search ............ 528/272, 291, 292, 298, 528/302, 308, 308.6, 332, 425, 220, 226, 228, 229; 525/437, 443, 471; 524/765, 770; 8/676; 548/265

[56] References Cited

U.S. PATENT DOCUMENTS

| | | | |
|---|---|---|---|
| 3,689,501 | 9/1972 | Weaver et al. | 548/265 |
| 4,267,306 | 5/1981 | Davis et al. | 528/226 |
| 4,359,570 | 11/1982 | Davis et al. | 528/289 |
| 4,403,092 | 9/1983 | Davis et al. | 528/290 |

FOREIGN PATENT DOCUMENTS 47-13384 4/1972 Japan.

*Primary Examiner*—John Kight, III
*Assistant Examiner*—Sam A. Acquah
*Attorney, Agent, or Firm*—J. Frederick Thomsen; William P. Heath, Jr.

[57] ABSTRACT

Disclosed are colored polyester compositions comprising a polyester having reacted therewith or copolymerized therein at least one residue of an anthraquinone compound having the formula

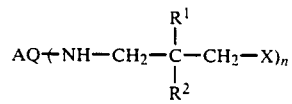

wherein AQ is the residue of a 9,10-anthraquinone radical; $R^1$ and $R^2$ are the same or different and are unsubstituted or substituted alkyl, cycloalkyl or aryl; X is a group reactive with at least one of the functional groups of the monomers from which the polyester is prepared; and n is 1 or 2. The described anthraquinone compounds possess improved thermal stability and thus are not decomposed at the high temperatures at which polyesters are prepared. Also disclosed are shaped articles, particularly containers, fabricated from the colored polyester compositions.

20 Claims, No Drawings

POLYESTERS COLORED WITH THE RESIDUE OF HEAT STABLE ANTHRAQUINONE COMPOUNDS

This invention concerns colored polyester compositions comprising a polyester having reacted therewith or copolymerized therein at least one residue of certain anthraquinone compounds. This invention also concerns containers such as beverage bottles and other shaped articles fabricated from the colored polyester compositions.

Colorant used in polyester materials designed for use in packaging food products, beverages, pharmaceutical preparations, cosmetics and other materials destined for ingestion by or application on humans should not migrate to the contents of the package, i.e., be extracted from the container wall by the material contained within the package. It is known that anthraquinone compounds can be reacted with or copolymerized in polyesters to produce a colored polyester material from which the anthraquinone colorant is non-extractable. See, for example, U.S. Pat. Nos. 4,267,306, 4,359,570 and 4,403,092. Typically, an anthraquinone compound bearing one or more polyester-reactive groups, e.g., hydroxyl, carboxy or alkoxycarbonyl, are reacted into the polyester at some stage of the polyester's preparation. Thus, it is essential that the reactive anthraquinone compound be stable at the high temperatures, e.g., up to 300° C., employed during the manufacture of high molecular weight, linear polyesters which are commonly used in the fabrication of packaging materials, especially beverage bottles.

Japanese Patent 72-13,384 discloses the preparation of colored polyesters for use in manufacturing colored fibers by incorporating in the monomers from which the polyesters are prepared certain anthraquinones bearing one or two reactive groups. The reactive groups are present on the alkyl moiety of alkylamino groups and have the formula —X—R—O—Y wherein X is NH or O, R is alkylene and Y is H or acetyl. We have found that these reactive anthraquinone compounds, i.e., those disclosed in Japanese Patent 72-13,384, decompose and, as a result, change color when they are added early in the synthesis of polyesters, e.g., prior to the polycondensation step. Decomposition results in a shift in the visible absorption curve and a loss of light absorption at the desired wavelength.

The colored polyesters provided by this invention comprise extrusion, molding and fiber grade polyester having reacted therewith or copolymerized therein up to, i.e., less than, 5,000 parts per million (ppm) of the residue of one or more anthraquinone compounds having the formula

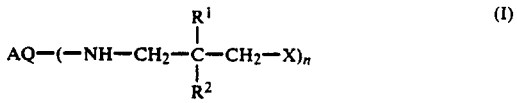

wherein

AQ is the residue of a 9,10-anthraquinone radical;

$R^1$ and $R^2$ are the same or different and are unsubstituted or substituted alkyl, cycloalkyl or aryl;

X is a group reactive with at least one of the functional groups of the monomers from which the polyester is prepared; and n is 1 or 2.

The anthraquinone compounds of formula (I) and the reacted residues thereof possess the advantage of being sufficiently thermally stable to permit their reaction or copolymerization with polyesters by adding them at the start or at an early stage of the polyester preparation. Neither the anthraquinone compounds nor their reacted residues sublime under polymerization conditions and the residues are not extractable from the polyesters. The colored polyesters of our invention thus can be used in the manufacture of fibers, film and other shaped articles but are especially useful in the manufacture of bottles and like containers by injection blow-molding techniques or other shaped articles when non-extractability is important.

The anthraquinone radicals represented by AQ can be unsubstituted, i.e., substituted only with one or two of the reactive groups

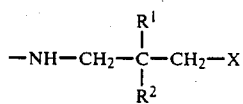

or substituted with one or more of a wide variety of substituents which are present on known anthraquinone colorants. Typical anthraquinone residues represented by AQ are described in the patents cited hereinabove as well as U.S. Pat. No. 3,689,501. Typical substituents which may be present on the anthraquinone nucleus represented by AQ include alkyl, alkoxy, substituted alkoxy, cycloalkoxy, hydroxy, halogen, aryloxy, aralkyloxy, alkylthio, cycloalkylthio, arylthio, cyano, sulfamoyl, substituted sulfamoyl, amino, substituted amino including acylamino, nitro, alkylsulfonyl, arylsulfonyl, carbamoyl and substituted carbamoyl are typical substituents which can be present on the anthraquinone nucleus A.

Cyclopentoxy, cyclohexoxy, 4-methylcyclohexoxy, and cycloheptoxy are typical cycloalkoxy groups. Phenoxy and phenoxy substituted with alkyl, alkoxy, hydroxy, halogen, etc. are representative of aryloxy groups which can be present on the anthraquinone nucleus. The alkoxy, cycloalkoxy, and aryloxy groups can be combined to form a chain containing a plurality of alkylene, arylene and cycloalkylene moieties joined by ether linkages. Preferred alkoxy, cycloalkoxy and aryloxy groups have the general formula

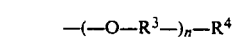

wherein $R^3$ is lower alkylene, lower phenylenealkyl, lower cyclohexylenealkyl, phenylene, lower alkylphenylene, halophenylene, cyclohexylene or lower alkylcyclohexylene; n is 1, 2, 3 or 4; and $R^3$ is hydrogen or alkyl. In the above formula, when n is more than 1, each $R^3$ can represent the same or different alkylene, cycloalkylene or arylene group. The following groups are typical of those conforming to the formula —(—O—$R^3$—)$_n$—$R^4$: 2-(2-ethoxyethoxy)-ethoxy, 2-butoxyethoxy, 2-phenoxyethoxy, 4-methoxyphenoxy, 4-(2-methoxyethoxy)-phenoxy, 2-[4-(2-methoxyethoxy)-phenoxy]ethoxy, 3-[2-(4-phenoxybutoxy)ethoxy]-propoxy, 4-(methoxymethyl)cyclohexylmethoxy, 2-methylphenoxy, 2,4-diethoxyphenoxy, benzyloxy, and 4-butoxymethylphenylmethoxy.

Methylthio, ethylthio, propylthio, butylthio, hexylthio, phenylthio, 4-ethoxyphenylthio, 4-chlorophenylthio, cyclohexylthio, etc. are examples of the alkyl-, cycloalkyl- and arylthio which can be present on the anthraquinone nucleus.

The sulfamoyl and carbamoyl groups can be substituted, for example, with alkyl, substituted alkyl, cycloalkyl, or aryl or the nitrogen atom of the sulfamoyl and carbamoyl groups can be a member of a ring. Preferred sulfamoyl and carbamoyl groups have the structures

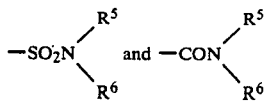

wherein $R^5$ and $R^6$ are the same or different and each is hydrogen, lower alkyl or, when taken collectively with the nitrogen atom to which they are attached, $R^5$ and $R^6$ represent the atoms necessary to complete a piperidino, lower alkylpiperidino, morpholino, lower alkylmorpholino, N-alkylpiperazino, or thiomorpholine-S,S-dioxide ring. Dimethylsulfamoyl, di(2-hydroxyethyl)-sulfamoyl, phenylcarbamoyl, butylcarbamoyl, diethylcarbamoyl, cyclohexylsulfamoyl, N-ethylpiperazinosulfonyl, piperidinosulfonyl, and morpholinosulfonyl are representative substituted sulfamoyl and carbamoyl groups.

The amino groups which can be present on the anthraquinone nucleus can be unsubstituted amino or amino substituted, for example, with alkyl, substituted alkyl, cycloalkyl, aralkyl, aryl, sulfolanyl, or an acyl group. Chlorine, bromine, alkoxy, hydroxy, alkanoyloxy, cyano, etc. are typical substituents which can be present on alkyl groups. Preferably, the alkyl-, cycloalkyl-, aralkyl-, and aryl-amino groups which can be present on the anthraquinone nucleus conform to the formula

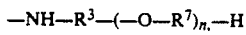

wherein $R^3$ and $R^7$ are the same or different and each is lower alkylene, lower phenylenealkyl, lower alkylphenylene-lower alkyl, lower halophenylenealkyl, lower alkoxycarbonylphenylene lower-alkyl, phenylene, lower alkylphenylene, halophenylene, cyclohexylene, or lower alkylcyclohexylene; and n' is 0, 1 or 2. When n is 2, each of the groups represented by $R^7$ can be the same or different. Methylamino, ethylamino, propylamino, isopropylamino, butylamino, 2-hydroxyethylamino, 3-(2-ethoxyethoxy)propylamino, benzylamino, 2-phenylethylamino, 4-ethylbenzylamino, 4-chlorobenzylamino, 4-methoxycarbonylbenzylamino, anilino, 3-hydroxyanilino, p-(2-[2-(3-methoxypropoxy)ethoxy]ethyl)phenylamino, cyclohexylamino, 4-ethylcyclohexylamino, and 4-(2-ethoxy)ethoxycyclohexylamino are typical of the amino groups conforming to the formula

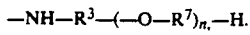

The acylamino groups which can be present on the anthraquinone radical have the formula $-NH-R^8$ wherein $R^8$ is formyl, alkanoyl, aroyl, cyclohexylcarbonyl, alkylsulfonyl, arylsulfonyl, carbamoyl, alkylcarbamoyl, arylcarbamoyl, furoyl, etc. The alkanoyl and alkylsulfonyl groups can be substituted with groups such as halogen, phenyl, cyano, alkoxy, alkylthio, alkylsulfonyl, etc. Acetyl, propionyl, butyryl, cyanoacetyl, chloroacetyl, phenylacetyl, methoxyacetyl, methylthioacetyl, methylsulfonylacetyl, methylsulfonyl, ethylsulfonyl, propylsulfonyl, butylsulfonyl, 2-cyanoethylsulfonyl, 2-methoxyethylsulfonyl, and 2-chloroethylsulfonyl are examples of the alkanoyl and alkylsulfonyl groups which $R^8$ can represent. The aryl group of the aroyl, aryloxycarbonyl, arylsulfonyl, and alkylcarbamoyl group is preferably monocyclic, carbocyclic aryl such as unsubstituted phenyl and phenyl substituted with, for example, alkyl, alkoxy, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which $R^8$ can represent.

The anthraquinone nucleus also can be substituted at the α- and β-positions with a group having the formula $-NH-$arylene$-S-$, $-NH-$arylene$-SO-$ or $-NH-$arylene$-SO_2-$ in which the arylene group is an unsubstituted or substituted o-phenylene radical.

The nitrogen atom of $-NH-$ of the reactive group

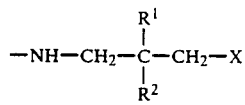

is bonded directly to a nuclear atom, i.e., a ring carbon atom, of anthraquinone nucleus AQ. When n is 1, the reactive anthraquinone compounds function as a chain-terminating group, e.g.,

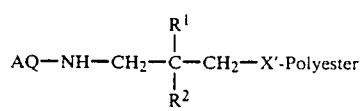

wherein X' is the residue of reactive substituent X. When n is 2, the reactive anthraquinone compounds function as a copolymerizable monomer and are present within the polymer chain of the polyester, e.g.,

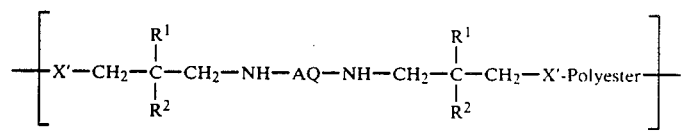

Preferably, anthraquinone radical AQ is not substituted with more than 4 substituents including the reactive substituents

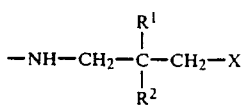

It also is preferred that the aforesaid reactive substituent or substituents are present at the 1-, 4-, 5- and/or 8-position of anthraquinone radical AQ. Further preferred are anthraquinone compounds which bear 2 reactive substituents, i.e., the compounds of formula (I) wherein n is 2.

Examples of the alkyl, cycloalkyl and aryl groups which $R^1$ and $R^2$ may represent are set forth hereinabove relative to the description of the substituents which may be present on anthraquinone nucleus AQ. $R^1$ and $R^2$ preferably represent lower alkyl, i.e., alkyl of up to about 4 carbon atoms, especially methyl.

Examples of the reactive groups which X may represent include hydroxy, carboxy, an ester radical, amino, alkylamino, and the like. The ester radicals may be any radical having the formula

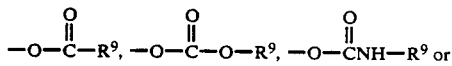

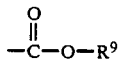

wherein $R^9$ is an unsubstituted or substituted alkyl, cycloalkyl or aryl radical such as those described hereinabove, preferably unsubstituted alkyl, e.g., alkyl of up to about 8 carbon atoms, or phenyl, and most preferably, lower alkyl. Reactive group X preferably is hydroxy or alkanoyloxy or up to about 4 carbon atoms, e.g., acetoxy.

The preferred colored polyester compositions of our invention comprise extrusion, molding or fiber grade linear polyester having copolymerized therein from about 1 to 5,000 parts per million (ppm) of the residue of one or more anthraquinone compounds having the formulas

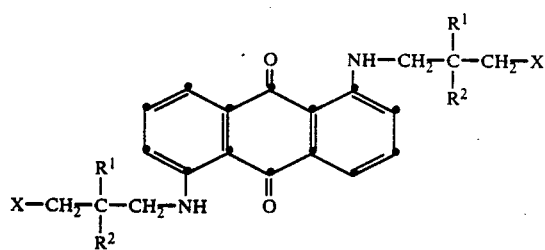

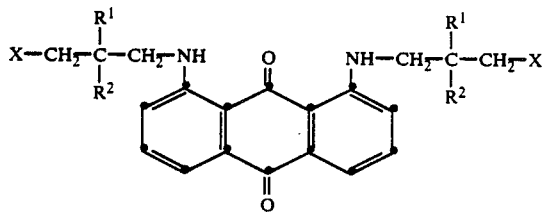

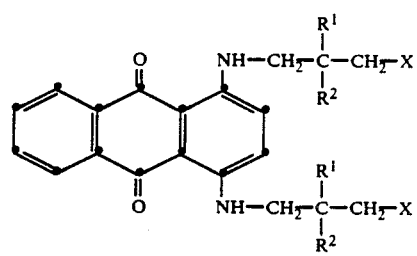

wherein $R^1$, $R^2$ and X are defined hereinabove. Polyesters containing the residues of the first 2 formulas are a red shade whereas polyesters containing residues of the third formula are a blue shade. $R^1$ and $R^2$ preferably are lower alkyl, especially methyl, and X preferably is hydroxy or lower alkanoyloxy. Reactive radical

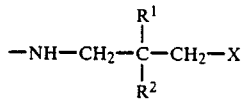

most preferably is 2,2-dimethyl-3-hydroxypropylamino.

The anthraquinone compounds described hereinabove may be prepared using known procedures and anthraquinone reactants, or procedures and/or reactants analogous thereto, wherein an anthraquinone reactant containing amine-displaceable groups is reacted with an amine:

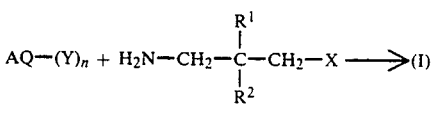

wherein Y is a displaceable substituent such as halogen, nitro and sulfo and $R^1$, $R^2$, X and n are defined above Typical synthesis procedures are described in E. Barnett, *Anthracene and Anthraquinone*, Bailliere, Tindall and Cox, London, 1921; H. A. Lubs, Editor, *The Chemistry of Synthetic Dyes and Pigments*, Reinhold Publishing Corporation, New York, 1955; and H. E. Fierz-David and L. Blangley, *Fundamental Process of Dye Chemistry*, Interscience Publishers, Inc., New York, 1949. The preferred anthraquinone reactants (II) are the 1,5- and 1,8-dichloroanthraquinones. Displacement of halogen may be carried out by heating a dihaloanthraquinone with excess amine (III) at about 125 to 130° C. for several hours. Solvents such as glycol ethers, diglycol ethers, N,N-dimethylformamide, alcohols, tetrahydrothiophene-S,S-dioxide (sulfolane) and the like may be used advantageously. The use of acid acceptors such as sodium carbonate, sodium bicarbonate, sodium acetate and the like, other than excess amine (III), may be advantageous in the synthesis of some compounds. Dinitroanthraquinone reactants usually are reacted as a mixture of the 1,5- and 1,8-isomers to produce isomeric mixtures of anthraquinone compounds of formula (I).

Anthraquinone compounds of formula (I) bearing reactive groups at the 1- and 4-positions may be prepared by reacting a mixture of quinizarin (1,4-dihydroxyanthraquinone) and leucoquinizarin with amines (III) according to known procedures using solvents such as alcohols, glycol ethers or, in some cases, water. Boric acid, zinc chloride, aliphatic carboxylic acids and similar compounds are known to catalyze the reaction.

Certain of the anthraquinone compounds of formula (I) may be converted to other anthraquinone compounds by means of one or more known reactions. For example, anthraquinone substituted with a reactive group at the 1-position [obtained by the reaction of 1-chloroanthraquinone with amine (III)] may be brominated to obtain the corresponding 4-bromoanthraquinone compound, a versatile reactant which can be converted into various compounds. For example, the 4-bromo substituent may be displaced by various groups: (i) by amines including substituted amines such as alkyl, cycloalkyl and aryl amines; (ii) by alkoxides; (iii) by mercaptides; (iv) by sulfinic acid salts; and (v) by sulfonamide salts.

Anthraquinone compounds of formula (I) wherein X is hydroxy may be converted to compounds in which X is a different reactive group. Thus, hydroxy group X may be converted to an ester group by the reaction of the former group with various acylating agents such as carboxylic acid chlorides, carboxylic acid anhydrides, chloroformate esters, isocyanates and the like. The hydroxy group may be converted to a halogen substituent with a halogenating agent such as a thionyl halide or phosphorus oxychloride followed by reaction with ammonia to obtain the compound wherein X is amino. The halogen-substituted compound also may be reacted with an inorganic cyanide such as an alkali cyanide to obtain an intermediate nitrile which can be hydrolyzed under acidic conditions to obtain anthraquinone compounds of formula (I) wherein X is carboxy.

Amines of formula (III) are known compounds and/or can be prepared by published procedures. Generally, the amines may be obtained by reacting an aldehyde with ammonia in the presence of hydrogen at elevated pressures and temperatures in the presence of a hydrogenation catalyst such as Raney nickel:

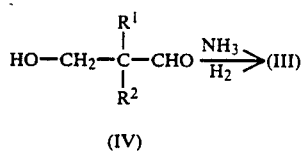

(IV)

wherein $R^1$ and $R^2$ are defined above [U.S. Pat. No. 2,618,658]. Aldehydes (IV) may be synthesized by the condensation of a branched-chain aldehyde with formaldehyde in the presence of a base such as sodium or potassium carbonate according to well-known processes [E. T. Stiller et al, J. Amer. Chem. Soc., 62, 1785 (1940)]. Another means for the preparation of amines (III) involves the reaction of di-substituted propiolactones with hydrazine to give the corresponding hydrazide which are converted to amines (III) upon reduction [B.I.R. Nicolaus, J. Org. Chem., 26, 2253 (1961)].

The reactive anthraquinone compounds of formula (I) and their preparation are further illustrated by the following examples.

EXAMPLE 1

A mixture of 1,5-dichloroanthraquinone (138.0 g, 0.5 mol), 3-amino-2,2-dimethylpropanol (206.0 g, 2.0 mol) and 2-ethoxyethanol (1 L) is heated at about 130° C. for 22 hours with good agitation. The dark red reaction mixture is cooled to about 40° C. and demineralized water (3 L) is added to precipitate the product, 1,5-bis-[(3-hydroxy-2,2-dimethylpropyl)amino]anthraquinone, which is collected by filtration, washed with demineralized water and air dried to yield 203.0 g of product (99% of theory). Highly crystalline product (168 g, 82% of theory) is obtained by reslurrying the crude product in hot methanol, cooling the slurry to room temperature, collecting the solids by filtration, washing with methanol and drying in air. Further purification, if required, is accomplished by heating one part of the product in ten parts N,N-dimethylformamide in the presence of charcoal, filtering hot, cooling, collecting by filtration, washing with methanol and drying in air. The structure of the product is supported by mass spectrometry. The product exhibits a λmax at 528 nm (ε max=14,662) in methylene chloride.

EXAMPLE 2

A mixture of 1,8-dichloroanthraquinone (13.8 g, 0.05 mol), 3-amino-2,2-dimethylpropanol (20.6 g, 0.20 mol) and 2-ethoxyethanol (100 mL) is heated at about 130° C. for 20 hours. The reaction mixture is drowned into water (1 L) and the mixture is acidified with concentrated hydrochloric acid. The product, 1,8-bis[(3-hydroxy-2,2-dimethylpropyl)amino]anthraquinone, is obtained in an essentially quantitative yield by filtering, washing with water and drying in air. Recrystallization from toluene, followed by filtration, washing with hexane and air drying gives 16.0 g of purified crystalline product. The product may be purified further by recrystallization from methanol. Thin layer chromatography shows that the product contains only one colored component and mass spectrometry analysis is consistent with 1,8-bis[(3-hydroxy-2,2-dimethylpropyl)amino]anthraquinone. The bluish-red product has an absorption maximum at 556 nm and an extinction coefficient (ε) of 12,228 in methylene chloride.

EXAMPLE 3

A mixture of quinizarin (3.60 g, 0.15 mol), leucoquinizarin (12.1 g, 0.05 mol), 3-amino-2,2-dimethylpropanol (103.0 g, 1.0 mol) and 2-ethoxyethanol (500 mL) is heated at reflux for 12 hours. After cooling, the product, 1,4-bis[(3-hydroxy-2,2-dimethylpropyl)amino]anthraquinone, confirmed by mass spectrometry, is collected by filtration, washed with methanol and air dried. The dark blue product is obtained in a yield of 77 g, 94% of theory. The product has absorption maxima at 646 nm (ε=18,742) and 600 nm in N,N-dimethylformamide.

EXAMPLE 4

A mixture of 1-chloroanthraquinone (145.2 g, 0.60 mol), 3-amino-2,2-dimethylpropanol (206.0 g, 2.0 mol) and 2-ethoxyethanol (1 L) is heated at reflux for 8 hours. The reaction mixture is drowned into water (3 L) and the mixture is acidified with concentrated hydrochloric acid. The product, 1-[(3-hydroxy-2,2-dimethylpropyl)amino]anthraquinone, is collected by filtration, washed with water and dried in air. A yield of 173 g (93.5% of theory) of the red product is obtained. The identity of the product is confirmed by mass spectrometry. In methylene chloride, the λmax of the product is 510 nm.

EXAMPLE 5

To a solution of 1-[(3-hydroxy-2,2-dimethylpropyl)amino]anthraquinone (88.0 g, 0.28 mol) in pyridine (400 mL) is added bromine (48.0 g, 0.30 mol) with vigorous agitation, allowing the temperature to rise to about 40° C. The reaction is completed by heating at 90 to 95° C. for 6 hours and then allowed to cool. Methanol (200 mL) is added, stirring continued for about 2 hours at room temperature and the product is then drowned into water with thorough stirring. The solids are collected by filtration, washed with water and dried in air to give 101.3 g of 4-bromo-1-[(3-hydroxy-2,2-dimethyl-propyl) amino]anthraquinone. The identity of the product is confirmed by mass spectrometry analysis.

EXAMPLE 6

4-Bromo-1-[(3-hydroxy-2,2-dimethyl-propyl)amino]anthraquinone (116.4 g, 0.30 mol) is added to acetic anhydride (600 mL) and the mixture is heated at reflux for 4 hours. Excess acetic anhydride is removed on a rotary evaporator under vacuum. Methanol (500 mL) is added to the residue and the mixture is heated with stirring for a few minutes. After cooling, the bright red product is collected by filtration, washed with methanol and air dried. Mass spectrometry confirms that acetylation has occurred at the hydroxy group to give 4.bromo-1-[(3-acetoxy-2,2-dimethylpropyl)amino]-anthraquinone which exhibits a λmax at 510 nm. A significant hypsochromic shift would be expected if acetylation of the nitrogen atom occurs.

COMPARATIVE EXAMPLE 1

A mixture of quinizarin (13.1 g, 0.054 mol), phenol (16.0 g), 2-aminoethanol (11.0 g, 0.18 mol), ethanol (60 mL), water (40 mL) and 50% aqueous sodium hydroxide (8.0 g) is heated at reflux for about 10 hours. Ethanol (24 mL) and water (16 mL) are added to facilitate stirring and refluxing is continued for an additional 6 hours. The reaction mixture is filtered and washed with water. To remove trace amounts of violet and red impurities, the water-wet filter cake is reslurried in 7% aqueous sodium hydroxide (600 mL) and the mixture is heated to boiling with good stirring. The solids are collected by filtration, washed free of alkali with hot water and dried at 60° C. to obtain 15.3 g of 1,4-bis.(2-hydroxyethylamino)anthraquinone which exhibits absorption maxima at 638 nm and 593 nm in the visible absorption spectrum in acetone.

COMPARATIVE EXAMPLE 2

A mixture of 1,5-dichloroanthraquinone (138.0 g, 0.50 mol), 2-aminoethanol (200 g, 3.30 mol) and 2-ethoxyethanol (1.0 L) is heated at reflux for 20 hours with good stirring. The dark red reaction mixture is cooled and water (1.5 L) is added to precipitate the product, 1,5-bis(2-hydroxy-ethylamino)anthraquinone, which is collected by filtration, washed with water (500 mL) and then methanol (500 mL) and dried in air. The product is purified by recrystallizing from N,N-dimethylformamide (2 L) in the presence of charcoal. The yield is 104 g (63.8% of theory) of pure product which has an absorption maximum at 520 nm (ε=13,667) in the visible absorption spectrum in N,N-dimethylformamide.

Additional anthraquinone compounds which may be utilized in the preparation of our novel colored polyester compositions are set forth in Table I. These compounds may be prepared by the procedures referred to herein and conform to the formula

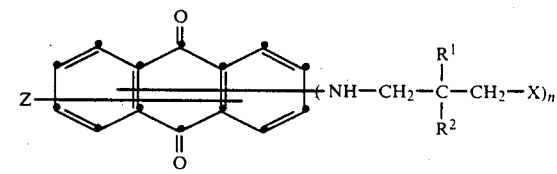

wherein n is 1 or 2. The heading "Position(s)" in Table I refers to the position or positions of the reactive group

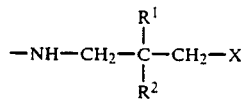

on the anthraquinone nucleus.

TABLE I

| Example | R¹, R² | X | Position(s) | Z |
|---|---|---|---|---|
| 7 | di-CH₃ | —OOCCH₃ | 1,5 | H |
| 8 | di-CH₃ | —OOCOC₂H₅ | 1,5 | H |
| 9 | di-CH₃ | —OOCCH(CH₃)₂ | 1,5 | H |
| 10 | di-CH₃ | —OOCC₆H₅ | 1,5 | H |
| 11 | di-CH₃ | —OOCC₆H₁₁ | 1,5 | H |
| 12 | di-CH₃ | —OOCOC₆H₅ | 1,5 | H |
| 13 | di-CH₃ | —OOCNHC₂H₅ | 1,5 | H |
| 14 | di-CH₃ | —OOCNHC₆H₅ | 1,5 | H |
| 15 | di-CH₃ | —OOCC₆H₄-4-COOCH₃ | 1,5 | H |
| 16 | di-C₂H₅ | —OH | 1,5 | H |
| 17 | —CH₃, —CH₂CH(CH₃)₂ | —OH | 1,5 | H |
| 18 | di-C₆H₅ | —OH | 1,5 | H |
| 19 | —C₆H₅, —C₂H₅ | —OH | 1,5 | H |
| 20 | —C₆H₅, —CH₂C₆H₅ | —OH | 1,5 | H |
| 21 | —C₆H₁₁, —CH₃ | —OH | 1,5 | H |
| 22 | —C₆H₅, —CH₃ | —OH | 1,5 | H |
| 23 | —CH₃, —C=CHCH=CHS | —OH | 1,5 | H |
| 24 | —C₂H₅, —C=CHCH=CHO | —OH | 1,5 | H |
| 25 | di-CH₃ | —COOH | 1,5 | H |
| 26 | —C₂H₅, —CH₃ | —COOCH₃ | 1,5 | H |
| 27 | di-CH₃ | —NH₂ | 1,5 | H |
| 28 | —CH₂C₆H₅, —CH₃ | —NHC₂H₅ | 1,5 | H |
| 29 | di-CH₃ | —NHCH₃ | 1,5 | H |
| 30 | di-CH₃ | —NHCH₂C₆H₅ | 1,5 | H |
| 31 | di-CH₃ | —NHCH₂C₆H₁₁ | 1,5 | H |
| 32 | di-CH₃ | —NHC₆H₅ | 1,5 | H |
| 33 | di-CH₃ | —OH | 1,5 | 8-Cl |
| 34 | di-CH₃ | —OH | 1,5 | 8-Br |
| 35 | di-CH₃ | —OH | 1,5 | 8-OCH₃ |
| 36 | di-CH₃ | —OOCC₂H₅ | 1,8 | H |
| 37 | di-CH₃ | —OOCOCH₃ | 1,8 | H |

TABLE I-continued

| Example | R¹, R² | X | Position(s) | Z |
|---|---|---|---|---|
| 38 | di-$CH_3$ | —COOH | 1,8 | H |
| 39 | di-$CH_3$ | —$COOCH_3$ | 1,8 | H |
| 40 | di-$CH_3$ | —$COOCH_2CH_2OH$ | 1,8 | H |
| 41 | di-$CH_3$ | —$COOCH_2CH_2CN$ | 1,8 | H |
| 42 | di-$CH_3$ | —$COOCH_2C_6H_5$ | 1,8 | H |
| 43 | di-$CH_3$ | —$COO(CH_2CH_2O)_2H$ | 1,8 | H |
| 44 | di-$CH_3$ | —$NH_2$ | 1,8 | H |
| 45 | di-$CH_3$ | —$NHC_2H_5$ | 1,8 | H |
| 46 | di-$CH_3$ | —$COOC_6H_5$ | 1,8 | H |
| 47 | —$CH_3$, —$C_2H_5$ | —OH | 1,8 | H |
| 48 | —$CH_3$, —$C_6H_5$ | —OH | 1,8 | H |
| 49 | —$CH_3$, —$(CH_2)_4H$ | —OH | 1,8 | H |
| 50 | —$CH_3$, —$C_6H_{11}$ | —OH | 1,8 | H |
| 51 | di-$CH_3$ | —$OOCC_6H_4$-4-$COOCH_3$ | 1,8 | H |
| 52 | di-$CH_3$ | —$OOCNHC_6H_4$-4-$CH_3$ | 1,8 | H |
| 53 | di-$CH_3$ | —$OOCNHCH_3$ | 1,8 | H |
| 54 | di-$CH_3$ | —$OOCNCH_2CH_2OCH_2CH_2$ (cyclic) | 1,8 | H |
| 55 | —$CH_3$, —$C$=$CHCH$=$CHS$ (cyclic) | —$OOCC_6H_{10}$-4-$CH_3$ | 1,8 | H |
| 56 | —$CH_2C_6H_5$, —$CH$=$CHCH$=$CHO$ (cyclic) | —$OOCCH_2C_6H_5$ | 1,8 | H |
| 57 | di-$CH_3$ | —$OOCCH_2CH_2COOH$ | 1,8 | H |
| 58 | di-$CH_3$ | —$COOCC_6H_4$-4-$OCH_3$ | 1,8 | H |
| 59 | di-$CH_3$ | —$COOCH_2C$=$CHCH$=$CHO$ (cyclic) | 1,8 | H |
| 60 | di-$CH_3$ | —OH | 1,8 | 5-$CH_3$ |
| 61 | di-$C_2H_5$ | —OH | 1,8 | 5-$SC_6H_5$ |
| 62 | di-$CH_3$ | —OH | 1,8 | 4,5-di-$SCH_3$ |
| 63 | di-$CH_3$ | —OH | 1,8 | 4,5-di-Cl |
| 64 | di-$CH_3$ | —$OOCCH_3$ | 1,4 | H |
| 65 | di-$CH_3$ | —$OOCC_6H_4$-4-$COOCH_3$ | 1,4 | H |
| 66 | di-$CH_3$ | —$OOCCH_2CH_2COOH$ | 1,4 | H |
| 67 | di-$CH_3$ | —$NH_2$ | 1,4 | H |
| 68 | di-$CH_3$ | —$NHC_2H_5$ | 1,4 | H |
| 69 | di-$CH_3$ | —COOH | 1,4 | H |
| 70 | di-$CH_3$ | —$COOCH_2CH_2OH$ | 1,4 | H |
| 71 | —$C_2H_5$, —$CH_3$ | —$COOC_2H_5$ | 1,4 | H |
| 72 | —$C_6H_5$, —$CH_3$ | —OH | 1,4 | H |
| 73 | —$CH_3$, —$CH_2CH(CH_3)_2$ | —OH | 1,4 | H |
| 74 | —$CH_3$, —$C$=$CHCH$=$CHO$ (cyclic) | —OH | 1,4 | H |
| 75 | —$C_2H_5$, —$C$=$CHCH$=$CHS$ (cyclic) | —OH | 1,4 | H |
| 76 | —$CH_3$, —$CH_2C_6H_5$ | —OH | 1,4 | H |
| 77 | —$CH_3$, —$C_6H_{11}$ | —OH | 1,4 | H |
| 78 | di-$CH_3$ | —OH | 1,4 | 6-$SO_2C_6H_3$-3,4-di-Cl |
| 79 | di-$CH_3$ | —OH | 1,4 | 6-$SO_2C_6H_4$-4-$CH_3$ |
| 80 | di-$CH_3$ | —OH | 1,4 | 6-$CH_3$ |
| 81 | di-$CH_3$ | —OH | 1,4 | 6-Cl |
| 82 | di-$CH_3$ | —OH | 1,4 | 6,7-di-Cl |
| 83 | di-$CH_3$ | —OH | 1,4 | 5,8-di-Cl |
| 84 | di-$CH_3$ | —OH | 1,4 | 6,7-di-$OC_6H_5$ |
| 85 | di-$CH_3$ | —OH | 1,4 | 6-$OC_2H_5$ |
| 86 | di-$CH_3$ | —OH | 1,4 | 6-$SC_6H_5$ |
| 87 | di-$CH_3$ | —OH | 1,4 | 6-SC=N-o-$C_6H_4$—S (cyclic) |
| 88 | di-$CH_3$ | —OH | 1,4 | 6-$SO_2CH_3$ |
| 89 | di-$CH_3$ | —OH | 1,4 | 6-$SCH_2CH_2OH$ |
| 90 | di-$CH_3$ | —$COOCH_3$ | 1 | 5-Cl |
| 91 | di-$CH_3$ | —OH | 1 | 5-$SO_2CH_3$ |
| 92 | di-$CH_3$ | —OH | 1 | 5-$NHC_6H_5$ |

TABLE I-continued

| Example | R¹, R² | X | Position(s) | Z |
|---|---|---|---|---|
| 93 | di-CH₃ | —OH | 1 | 5-SC=N-o-C₆H₄—S (bridged) |
| 94 | di-CH₃ | —OOCCH₃ | 1 | 5-NHSO₂C₆H₅ |
| 95 | di-CH₃ | —OOCC₂H₅ | 1 | 8-Cl |
| 96 | di-CH₃ | —OH | 1 | 4-NHC₆H₅ |
| 97 | di-CH₃ | —OH | 1 | 4-NHC₆H₄-4-CH₂CH₂OH |
| 98 | di-CH₃ | —OH | 1 | 4-NHC₆H₄-4-OCH₂CH₂OH |
| 99 | di-CH₃ | —OH | 1 | 4-NHC₆H₄-3-CH₂OH |
| 100 | di-CH₃ | —OH | 1 | 4-NHC₆H₄-3-COOCH₃ |
| 101 | di-CH₃ | —OH | 1 | 4-NHC₆H₁₁ |
| 102 | di-CH₃ | —OH | 1 | 4-NHC₆H₄-3-CF₃ |
| 103 | di-CH₃ | —OH | 1 | 4-NHSO₂C₆H₄-4-CH₃ |
| 104 | di-CH₃ | —OH | 1 | 4-NH₂ |
| 105 | di-CH₃ | —OH | 1 | 4-NHSO₂CH₃ |
| 106 | di-CH₃ | —OH | 1 | 4-NHCOCH₃ |
| 107 | di-CH₃ | —OH | 1 | 4-SC=N-o-C₆H₄—S (bridged) |
| 108 | di-CH₃ | —OH | 1 | 4-Br |
| 109 | di-CH₃ | —OH | 1 | 2-CH₃, 4-Cl |
| 110 | di-CH₃ | —OH | 1 | 2-CH₃, 4-NHC₆H₅ |
| 111 | di-CH₃ | —OH | 1 | 2-Br, 4-NHC₆H₅ |
| 112 | di-CH₃ | —OH | 1,8 | 4,5-di-Br |

The colored polyester compositions provided by this invention comprise extrusion, molding and fiber grade, thermoplastic, linear polyester having reacted therewith or copolymerized therein up to 5,000 ppm of the residue or residues of one or more anthraquinone compounds of formula (I). It is apparent that the amount of anthraquinone residue present in the polyester material will vary substantially depending on several factors such as the particular anthraquinone being used, the tint or depth of shade desired, the presence of other colorant compounds, e.g., to produce a green or amber colored polyester, and the thickness of the article, e.g., film, bottle, etc., to be produced from the colored polyester composition. For example, relatively thin film and thin-walled containers require higher levels of the anthraquinone compounds to produce an equivalent color than do thicker articles such as sheet material or tubing. The anthraquinone residue usually will be present in the polyester in a concentration in the range of about 1 to less than 5000 ppm with a concentration of about 100 to 1,000 being more typical.

The polyesters which may be used in the preparation of the compositions of our invention include linear, thermoplastic, crystalline or amorphous polyesters produced by conventional polymerization techniques from one or more diols and one or more dicarboxylic acids. The polyesters normally have an inherent viscosity (IV) of about 0.4 to about 1.2. The preferred polyesters comprise at least about 50 mole percent terephthalic and/or 2,6-naphthalenedicarboxylic acid residues and at least about 50 mole percent ethylene glycol and/or 1,4-cyclohexanedimethanol residues. Particularly preferred polyesters are those containing from about 75 to 100 mole percent terephthalic and/or 2,6-naphthalenedicarboxylic acid residues and from about 75 to 100 mole percent ethylene glycol residues.

The diol components of the described polyesters may be selected from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)-tricyclo-[5.2.1.0]-decane wherein X represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The acid components (aliphatic, alicyclic, or aromatic dicarboxylic acids) of the linear polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

The novel colored polyester compositions provided by this invention are useful in the manufacture of containers or packages for comestibles such as beverages and foods. By the use of known heat-setting techniques, certain of the polyesters are, in terms of color, I.V. and heat distortion, stable at temperatures up to about 100° C. Such stability characteristics are referred to as "hot-fill" stability. Articles molded from these polyesters exhibit good thin-wall rigidity, excellent clarity and good barrier properties with respect to moisture and atmospheric gases, particularly carbon dioxide and oxygen. The colored polyesters are particularly useful for the fabrication of containers having a wall thickness of about 10 to 30 mils.

The linear polyesters most preferred for use in our invention comprise poly(ethylene terephthalate), poly(ethylene terephthalate) wherein up to 5 mole percent of the ethylene glycol residues have been replaced with residues derived from 1,4-cyclohexanedimethanol and poly(ethylene 2,6-naphthalenedicarboxylate) and wherein the polyesters have been sufficiently heat set and oriented by methods well known in the art to give a desired degree of crystallinity. For the manufacture of blow-molded beverage bottles, the most preferred polyesters have an I.V. of 0.65 to 0.85, and a glass transition temperature (Tg) greater than 70° C. The glass transition temperature (Tg) referred to herein is determined by Differential Scanning Calorimetry at a scan rate of 20 Centigrade Degrees/minute. The inherent viscosities (I.V., dl/g) of the polyesters described herein are determined at 25° C. using 0.5 g polymer per 100 mL of a solvent consisting of 60 parts by weight phenol and 40 parts by weight tetrachloroethane.

The preparation of the novel colored polyester compositions of this invention is further illustrated by the following examples.

EXAMPLE 113

The following materials are placed in a 500-mL three-necked, round-bottom flask:

| | |
|---|---|
| 97 g | (0.5 mol) dimethyl terephthalate |
| 62 g | (1.0 mol) ethylene glycol |
| 0.0087 g | Ti from a n-butanol solution of acetyl-triisopropyl titanate |
| 0.0192 g | (200 ppm) 1,4-bis[(3-hydroxy-2,2-dimethylpropyl)amino]anthraquinone |

The flask is equipped with a nitrogen inlet, stirrer, vacuum outlet, and condensing flask. The flask and contents are heated at 200° C. in a Belmont metal bath for 60 minutes, at 210° C. for 75 minutes and at 230° C. for 50 minutes with a nitrogen sweep over the reaction mixture. The temperature of the bath is increased to 270° C. and a vacuum with a slow stream of nitrogen bleeding in the system is applied over a ten-minute period until the pressure is reduced to 100 mm Hg and heating at that pressure is continued for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.3 mm Hg and polycondensation is continued for 16 minutes. The flask is removed from the metal bath and is allowed to cool in a nitrogen atmosphere while the polymer crystallizes. The resulting blue colored polymer has an inherent viscosity of 0.62 measured in a 60/40 ratio by weight of phenol/tetrachloroethane at a concentration of 0.5 g per 100 mL. A transmission spectrum of a 13 mil thick film molded from this polymer shows that the polyester material has not changed color indicating that neither the anthraquinone compound nor the copolymerized residue thereof has decomposed during polymerization.

COMPARATIVE EXAMPLE 3

The polymerization procedure described in Example 113 is repeated using 0.0192 g of 1,4-bis-[(2-hydroxyethyl)amino]anthraquinone in place of the anthraquinone compound used in Example 113. The polyester obtained has an inherent viscosity of 0.63. The color of the polyester is tan and a transmission spectrum of a 14 mil thick film shows loss of blue color indicating that a substantial amount of the anthraquinone compound is decomposed during polymerization.

EXAMPLE 114

The polymerization procedure described in Example 113 is repeated using 0.0192 g of 1,5-bis-[(3-hydroxy-2,2-dimethylpropyl)amino]anthraquinone in place of the anthraquinone compound used in Example 113. The bluish-red colored polyester obtained has an inherent viscosity of 0.62. A transmission spectrum of a 15 mil thick amorphous film molded from this polyester shows an absorption maximum at 525 nm which is essentially the same as the absorption maximum (528 nm) of 1,5-bis[(3-hydroxy-2,2-dimethyl-propyl)amino]-anthraquinone in dimethylformamide.

COMPARATIVE EXAMPLE 4

The polymerization procedure described in Example 113 is repeated using 0.0192 g of 1,5-bis-[(2-hydroxyethyl)amino]anthraquinone in place of the anthraquinone compound used in Example 113. The polyester obtained has an inherent viscosity of 0.63. A transmission spectrum of a 15 mil thick film shows an absorption maximum at 490 whereas the absorption maximum of 1,5-bis[(2-hydroxyethyl)amino]anthraquinone in N,N-dimethylformamide is 520 nm. Thus, a significant amount of 1,5-bis[(2-hydroxyethyl)amino]anthraquinone is decomposed during polymerization.

EXAMPLE 115

The polymerization procedure described in Example 113 is repeated using 0.0192 g of 1,8-bis-[(3-hydroxy-2,2-dimethylpropyl)amino]anthraquinone in place of the anthraquinone compound used in Example 113. The bluish-red colored polyester obtained has an inherent viscosity of 0.62. A transmission spectrum of a 14 mil thick amorphous film molded from this polyester shows a strong absorption peak at 556 nm which is very close to the absorption maximum (528 nm) of 1,8-bis-[(3-hydroxy-2,2-dimethylpropyl)amino]anthraquinone in dimethylformamide.

EXAMPLE 116

The polymerization procedure described in Example 113 is repeated using 0.0192 g of 1-[(3-hydroxy-2,2-dimethylpropyl)amino]anthraquinone in place of the anthraquinone compound used in Example 113. The colored polyester obtained has an inherent viscosity of 0.63. A transmission spectrum of a 14 mil thick film molded from this polymer shows that the color of the polyester material has not changed indicating that neither the anthraquinone compound nor the copolymerized residue thereof has decomposed during polymerization.

The invention has been described in detail with particular reference to preferred embodiments thereof, but it will be understood that variations and modifications can be effected within the spirit and scope of the invention.

We claim:

1. A colored polyester composition comprising extrusion, molding and fiber grade polyester having reacted therewith or copolymerized therein about 1 to 5,000 ppm of the residue of one or more anthraquinone compounds having the formula

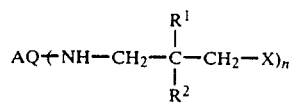

wherein
AQ is the residue of a 9,10-anthraquinone radical;

R¹ and R² are the same or different and are unsubstituted or substituted alkyl, cycloalkyl or aryl;

X is a group reactive with at least one of the functional groups of the monomers from which the polyester is prepared; and n is 1 or 2.

2. A colored polyester composition according to claim 1 comprising an extrusion or molding grade polyester having an inherent viscosity of about 0.4 to 1.2 comprised of 75 to 100 mole percent terephthalic or 2,6-naphthalenedicarboxylic acid residues and from about 75 to 100 mole percent ethylene glycol residues having reacted therewith about 1 to 5000 ppm of the residue of one or more anthraquinone compounds having the formula

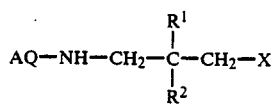

wherein

AQ is the residue of a 9,10-anthraquinone radical;

R¹ and R² are the same or different and are lower alkyl; and

X is hydroxy, carboxy, amino, alkyl amino or an ester group having the formula

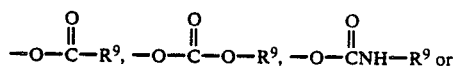

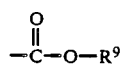

wherein $R^9$ is an unsubstituted or substituted alkyl, cycloalkyl or aryl radical.

3. A colored polyester composition according to claim 2 comprising an extrusion or molding grade polyester having an inherent viscosity of about 0.65 to 0.85 comprised of (1) poly(ethylene terephthalate), (2) poly(ethylene terephthalate) w herein up to about 5 mole percent of the ethylene glycol residues have been replaced with residues derived from 1,4-cyclohexanedimethanol, or (3) poly(ethylene 2,6-naphthalenedicarboxylate) having reacted therewith about 100 to 1,000 ppm of the residue of one or more anthraquinone compounds having the formula

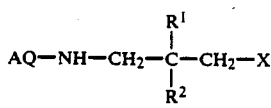

wherein R¹ and R² each is methyl and X is hydroxy or lower alkanoyloxy.

4. A colored polyester composition according to claim 1 comprising an extrusion or molding grade polyester having an inherent viscosity of about 0.65 to 0.85 comprised of (1) poly(ethylene terephthalate), (2) poly(ethylene terephthalate) wherein up to about 5 mole percent of the ethylene glycol residues have been replaced with residues derived from 1,4-cyclohexanedimethanol, or (3) poly(ethylene 2,6-naphthalenedicarboxylate) having copolymerized therein about 100 to 1,000 ppm of the residue of one or more anthraquinone compounds having the formula

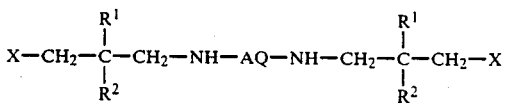

wherein

AQ is the residue of a 9,10-anthraquinone radical;

R¹ and R² are the same or different and are lower alkyl; and

X is hydroxy, carboxy, amino, alkyl amino or an ester group having the formula

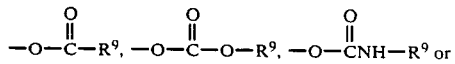

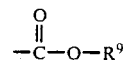

wherein $R^9$ is an unsubstituted or substituted alkyl, cycloalkyl or aryl radical.

5. A colored polyester composition according to claim 4 comprising an extrusion or molding grade polyester having an inherent viscosity of about 0.65 to 0.85 comprised of (1) poly(ethylene terephthalate), (2) poly(ethylene terephthalate) wherein up to about 5 mole percent of the ethylene glycol residues have been replaced with residues derived from 1,4-cyclohexanedimethanol, (3) or poly(ethylene 2,6-naphthalenedicarboxylate) having reacted therewith about 100 to 1,000 ppm of the residue of one or more anthraquinone compounds having the formula

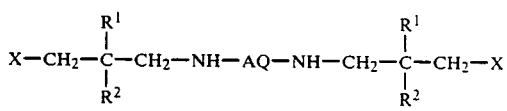

wherein R¹ and R² each is methyl and X is hydroxy or lower alkanoyloxy.

6. A colored polyester composition according to claim 1 comprising an extrusion or molding grade polyester having copolymerized therein about 1 to 5,000 ppm of the residue of one or more anthraquinone compounds having the formula

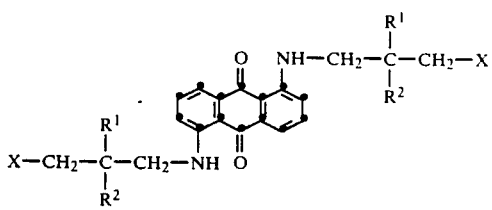

wherein

R¹ and R² are the same or different and are unsubstituted or substituted alkyl, cycloalkyl or aryl; and X is a group reactive with at least one of the functional groups of the monomers from which the polyester is prepared.

7. A colored polyester composition according to claim 6 comprising an extrusion or molding grade polyester having an inherent viscosity of about 0.4 to 1.2 comprised of 75 to 100 mole percent terephthalic or 2,6-naphthalenedicarboxylic acid residues and from about 75 to 100 mole percent ethylene glycol residues having copolymerized therein about 100 to 1,000 ppm of the anthraquinone compound, wherein $R^1$ and $R^2$ are the same or different and are lower alkyl; and X is hydroxy, carboxy, amino, alkyl amino or an ester group having the formula

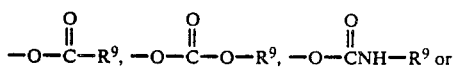

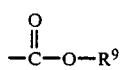

wherein $R^9$ is an unsubstituted or substituted alkyl, cycloalkyl or aryl radical.

8. A colored polyester composition according to claim 6 comprising an extrusion or molding grade polyester having an inherent viscosity of about 0.65 to 0.85 comprised of (1) poly(ethylene terephthalate), (2) poly(ethylene terephthalate) wherein up to about 5 mole percent of the ethylene glycol residues have been replaced with residues derived from 1,4-cyclohexanedimethanol, or (3) poly(ethylene 2,6-naphthalenedicarboxylate) having copolymerized therein about 100 to 1,000 ppm of the anthraquinone compound wherein $R^1$ and $R^2$ each is methyl and X is hydroxy or lower alkanoyloxy.

9. A colored polyester composition according to claim 1 comprising extrusion or molding grade polyester having copolymerized therein about 1 to 5,000 ppm of the residue of one or more anthraquinone compounds having the formula

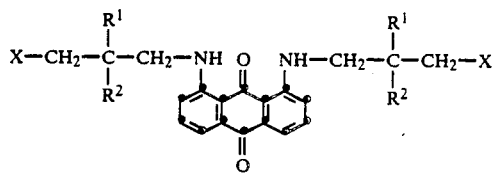

wherein $R^1$ and $R^2$ are the same or different and are unsubstituted or substituted alkyl, cycloalkyl or aryl; and X is a group reactive with at least one of the functional groups of the monomers from which the polyester is prepared.

10. A colored polyester composition according to claim 9 comprising an extrusion or molding grade polyester having an inherent viscosity of about 0.4 to 1.2 comprised of 75 to 100 mole percent terephthalic or 2,6-naphthalenedicarboxylic acid residues and from about 75 to 100 mole percent ethylene glycol residues having copolymerized therein about 100 to 1,000 ppm of the anthraquinone compound, wherein $R^1$ and $R^2$ are the same or different and are lower alkyl; and X is hydroxy, carboxy, amino, alkyl amino or an ester group having the formula

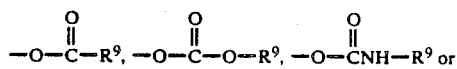

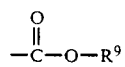

wherein $R^9$ is an unsubstituted or substituted alkyl, cycloalkyl or aryl radical.

11. A colored polyester composition according to claim 9 comprising an extrusion or molding grade polyester having an inherent viscosity of about 0.65 to 0.85 comprised of (1) poly(ethylene terephthalate), (2) poly(ethylene terephthalate) wherein up to about 5 mole percent of t-he ethylene glycol residues have been replaced with residues derived from 1,4-cyclohexanedimethanol, or (3) poly(ethylene 2,6-naphthalenedicarboxylate) having copolymerized therein about 100 to 1,000 ppm of the anthraquinone compound wherein $R^1$ and $R^2$ each is methyl and X is hydroxy or lower alkanoyloxy.

12. A colored polyester composition according to claim 1 comprising extrusion, molding and fiber grade polyester having copolymerized therein about 1 to 5,000 ppm of the residue of one or more anthraquinone compounds having the formula

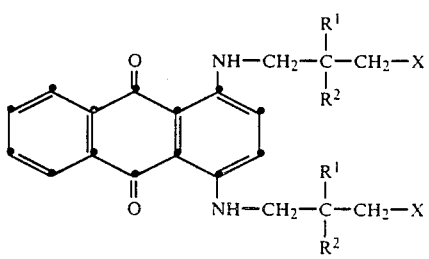

wherein $R^1$ and $R^2$ are the same or different and are unsubstituted or substituted alkyl, cycloalkyl or aryl; and X is a group reactive with at least one of the functional groups of the monomers from which the polyester is prepared.

13. A colored polyester composition according to claim 12 comprising an extrusion or molding grade polyester having an inherent viscosity of about 0.4 to 1.2 comprised of 75 to 100 mole percent terephthalic or 2,6-naphthalenedicarboxylic acid residues and from about 75 to 100 mole percent ethylene glycol residues having copolymerized therein about 100 to 1000 ppm of the anthraquinone compound, wherein $R^1$ and $R^2$ are the same or different and are lower alkyl; and X is hydroxy, carboxy, amino, alkyl amino or an ester group having the formula

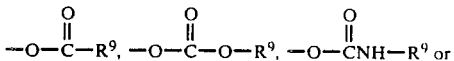

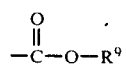

wherein $R^9$ is an unsubstituted or substituted alkyl, cycloalkyl or aryl radical.

14. A colored polyester composition according to claim 12 comprising an extrusion or molding grade polyester having an inherent viscosity of about 0.65 to 0.85 comprised of (1) poly(ethylene terephthalate), (2)

poly(ethylene terephthalate) wherein up to about 5 mole percent of the ethylene glycol residues have been replaced with residues derived from 1,4-cyclohexanedimethanol, or (3) poly(ethylene 2,6-naphthalenedicarboxylate) having copolymerized therein about 100 to 1,000 ppm of the anthraquinone compound wherein R¹ and R² each is methyl and X is hydroxy o lower alkanoyloxy.

15. A shaped article fabricated of the colored polyester composition of claim 1.

16. The shaped article of claim 14 wherein the article is a film, sheet material or container.

17. A container fabricated from a colored polyester composition comprising extrusion, molding and fiber grade polyester having reacted therewith or copolymerized therein about 1 to 5,000 ppm of the residue of one or more anthraquinone compounds having the formula

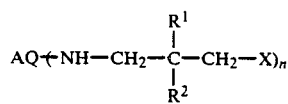

wherein
 AQ is the residue of a 9,10-anthraquinone radical;
 R¹ and R² are the same or different and are unsubstituted or substituted alkyl, cycloalkyl or aryl;
 X is a group reactive with at least one of the functional groups of the monomers from which the polyester is prepared; and
 n is 1 and 2.

18. A container fabricated from the colored polyester composition defined in claim 6.

19. A container fabricated from the colored polyester composition defined in claim 9.

20. A container fabricated from the colored polyester composition defined in claim 12.

* * * * *